United States Patent
Kim et al.

(10) Patent No.: US 10,264,539 B2
(45) Date of Patent: Apr. 16, 2019

(54) METHOD AND DEVICE BY WHICH NAN TERMINAL TRANSMITS NAN SERVICE DISCOVERY FRAME IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 236 days.

(21) Appl. No.: 15/113,031

(22) PCT Filed: Jan. 29, 2015

(86) PCT No.: PCT/KR2015/000970
§ 371 (c)(1),
(2) Date: Jul. 20, 2016

(87) PCT Pub. No.: WO2015/115829
PCT Pub. Date: Aug. 6, 2015

(65) Prior Publication Data
US 2017/0006562 A1    Jan. 5, 2017

Related U.S. Application Data

(60) Provisional application No. 61/932,813, filed on Jan. 29, 2014.

(51) Int. Cl.
*H04W 56/00* (2009.01)
*H04W 48/12* (2009.01)
(Continued)

(52) U.S. Cl.
CPC ......... *H04W 56/001* (2013.01); *H04W 48/12* (2013.01); *H04W 4/008* (2013.01);
(Continued)

(58) Field of Classification Search
CPC ....... H04W 84/12; H04W 84/18; H04W 4/80; H04W 56/001; H04W 8/005;
(Continued)

(56) References Cited

U.S. PATENT DOCUMENTS

2011/0038358 A1    2/2011    Wang et al.
2012/0229296 A1    9/2012    Ree
(Continued)

FOREIGN PATENT DOCUMENTS

| CN | 103260253 | 8/2013 |
|---|---|---|
| KR | 10-2012-0079741 | 7/2012 |
| KR | 1020130093854 | 8/2013 |

OTHER PUBLICATIONS

PCT International Application No. PCT/KR2015/000970, Written Opinion of the International Searching Authority dated May 1, 2015, 17 pages.
(Continued)

*Primary Examiner* — Rownak Islam
(74) *Attorney, Agent, or Firm* — Lee Hong Degerman Kang Waimey

(57) ABSTRACT

One embodiment of the present invention provides a method by which an NAN terminal transmits an NAN service discovery frame on a discovery window (DW) in a wireless communication system, and the method for transmitting an NAN service discovery frame comprises the steps of: determining a time that a packet is available for transmitting; starting a countdown according to a backoff counter of an NAN discovery frame from the time at which a packet is available for transmission; and transmitting the NAN service discovery frame when the countdown is finished, wherein if the NAN terminal transmits a synch beacon frame on the DW, the NAN service discovery frame is capable of being transmitted only when the synch beacon frame is transmitted.

20 Claims, 8 Drawing Sheets

(51) Int. Cl.
*H04W 4/80* (2018.01)
*H04W 74/08* (2009.01)
*H04W 4/00* (2018.01)
*H04W 8/00* (2009.01)
*H04W 84/12* (2009.01)
*H04W 88/02* (2009.01)
*H04W 84/18* (2009.01)

(52) U.S. Cl.
CPC .............. *H04W 4/80* (2018.02); *H04W 8/005* (2013.01); *H04W 74/08* (2013.01); *H04W 84/12* (2013.01); *H04W 84/18* (2013.01); *H04W 88/02* (2013.01)

(58) Field of Classification Search
CPC ..... H04W 74/08; H04W 88/02; H04W 48/08; H04W 48/12; H04W 74/00; H04W 4/008
USPC .......................................................... 370/350
See application file for complete search history.

(56) References Cited

U.S. PATENT DOCUMENTS

| | | | |
|---|---|---|---|
| 2013/0235770 A1 | 9/2013 | Merlin et al. | |
| 2014/0119357 A1* | 5/2014 | Abraham | H04W 56/001 370/338 |
| 2014/0241257 A1* | 8/2014 | Ding | H04W 48/08 370/329 |
| 2014/0301295 A1* | 10/2014 | Abraham | H04W 74/0808 370/329 |
| 2015/0071121 A1* | 3/2015 | Patil | H04W 40/24 370/255 |

OTHER PUBLICATIONS

Korean Intellectual Property Office Application No. 10-2016-7016140, Notice of Allowance dated Apr. 26, 2017, 4 pages.
Ahtiainen, A. et al., "Awareness Networking in Wireless Environments," IEEE Vehicular Technology Magazine, Digital Object Identifier 10.1109/MVT.2009.933475, Sep. 2009, 7 pages.

* cited by examiner

METHOD AND DEVICE BY WHICH NAN TERMINAL TRANSMITS NAN SERVICE DISCOVERY FRAME IN WIRELESS COMMUNICATION SYSTEM

CROSS-REFERENCE TO RELATED APPLICATIONS

This application is the National Stage filing under 35 U.S.C. 371 of International Application No. PCT/KR2015/000970, filed on Jan. 29, 2015, which claims the benefit of U.S. Provisional Application No. 61/932,813, filed on Jan. 29, 2014, the contents of which are all hereby incorporated by reference herein in their entirety.

TECHNICAL FIELD

Following description relates to a wireless communication system, and more particularly, to a method for a NAN (neighbor awareness networking) terminal to transmit a NAN service discovery frame and an apparatus therefor.

BACKGROUND ART

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

DISCLOSURE OF THE INVENTION

Technical Task

A technical task of the present invention is to determine transmission priority when a NAN (neighbor awareness networking) terminal transmits a NAN service discovery frame and a synch beacon frame in a single discovery window.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a NAN service discovery frame, which is transmitted by a NAN terminal on a DW (discovery window) in a wireless communication system, includes the steps of determining a time that a packet is available for transmission, starting a countdown according to a backoff counter of a NAN service discovery frame from the time at which a packet is available for transmission and, if the countdown is finished, transmitting the NAN service discovery frame. In this case, if the NAN terminal transmits a sync beacon frame on the DW, the NAN service discovery frame is capable of being transmitted only when the sync beacon frame is transmitted.

To further achieve these and other advantages and in accordance with the purpose of the present invention, according to a different embodiment, a NAN terminal transmitting a NAN (neighbor awareness networking) service discovery frame in a wireless communication system includes a transmission module and a processor, the processor configured to determine a time that a packet is available for transmission, the processor configured to start a countdown according to a backoff counter of a NAN service discovery frame from the time at which a packet is available for transmission, the processor, if the countdown is finished, configured to transmit the NAN service discovery frame. In this case, if the NAN terminal transmits a sync beacon frame on the DW, the NAN service discovery frame is capable of being transmitted only when the sync beacon frame is transmitted.

One embodiment of the preset invention can include one or more items described in the following.

The backoff counter of the NAN service discovery frame can be generated per each packet.

A time that a packet is available for transmission of the NAN service discovery frame may correspond to a time appearing after a time at which transmission of the sync beacon frame is completed.

If the NAN terminal transmits a plurality of NAN service discovery frames, a time that a packet is available for transmission of a second NAN service discovery frame may correspond to a time appearing after a time at which transmission of a first NAN service discovery frame is completed.

The backoff counter of the NAN service discovery frame may start at TStartDW+HC*40*aSlotTime, the TStart may correspond to a start point of the DW, the HC may correspond to a hop counter, and the aSlotTime may correspond to a MAC value configured by the terminal.

If the HC corresponds to 0, a backoff counter of the sync beacon frame may correspond to a value randomly selected from [0, CW_RS] section. If the HC is greater than 0, the backoff counter of the sync beacon frame may correspond to a value randomly selected from [0, 31].

If the NAN terminal does not transmit the sync beacon frame on the DW, a backoff counter of the NAN service discovery frame may start at TStartDW+(HCmax+1)*40*aSlotTime, the TStartDW may correspond to a start point of the DW, the HCmax may correspond to a biggest hop counter in a cluster to which the NAN terminal belongs thereto, and the aSlotTime may correspond to a MAC value configured by the terminal.

If a hop counter of the terminal is greater than 0, a backoff counter of the sync beacon frame may start at [A+(HC−1)*B+HC*C, A+(HC*B)+(HC+1)*C], if the HC corresponds to 0, the A may correspond to a value configured as a section maximum value or a maximum value+1 for configuring the backoff counter of the sync beacon frame, the B may correspond to a section size value configured per each of the HC, and the C may correspond to a variable for securing a section for transmitting a NAN service discovery frame in each section.

The section size value configured per each of the HC may correspond to a value configured with a same interval or a value predetermined per each of the HC.

A backoff counter of the NAN service discovery frame may stop a countdown while a backoff counter of the sync beacon frame is counting down.

If the sync beacon frame is transmitted, the countdown can be resumed.

The NAN terminal may be in a master status.

Advantageous Effects

According to the present invention, it is able to guarantee not only efficiency of a resource use but also freedom of a hop counter use. Moreover, it is also able to guarantee stability of an entire NAN cluster at the same time.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram illustrating a discovery window and the like;

BEST MODE

Mode for Invention

Figure 1:
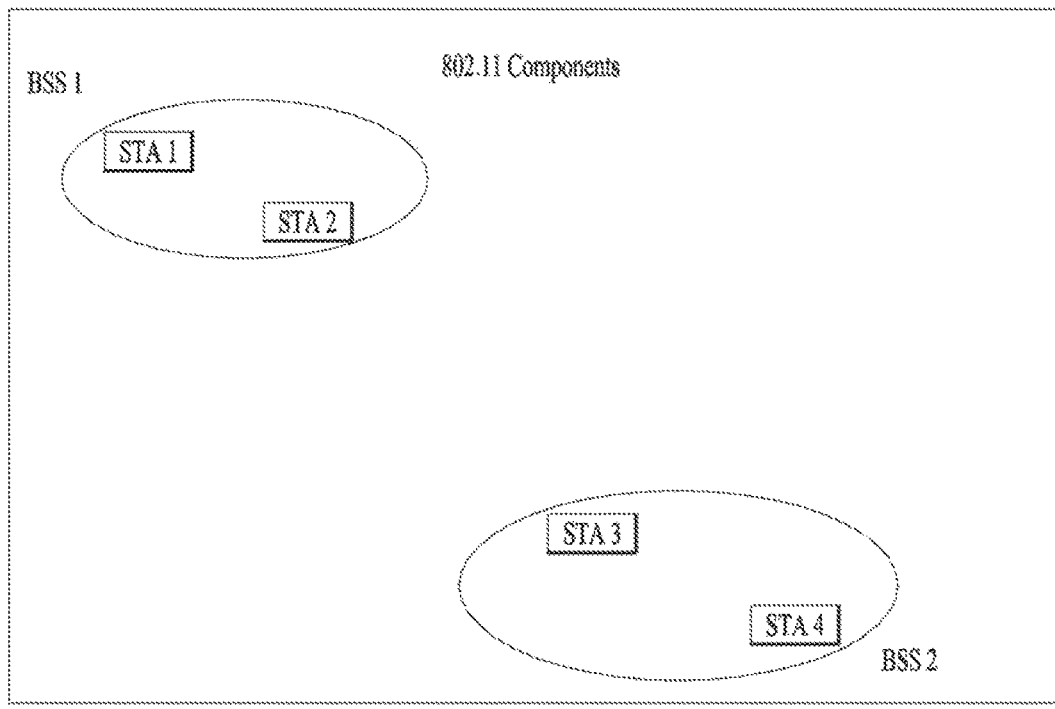
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
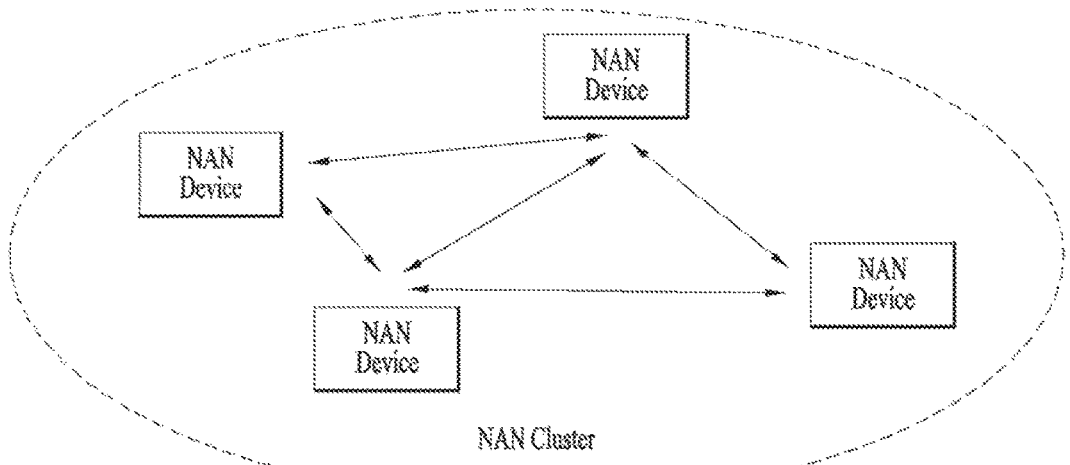
FIGS. 2 and 3 are diagrams illustrating examples of a NAN cluster.
Figure 3:
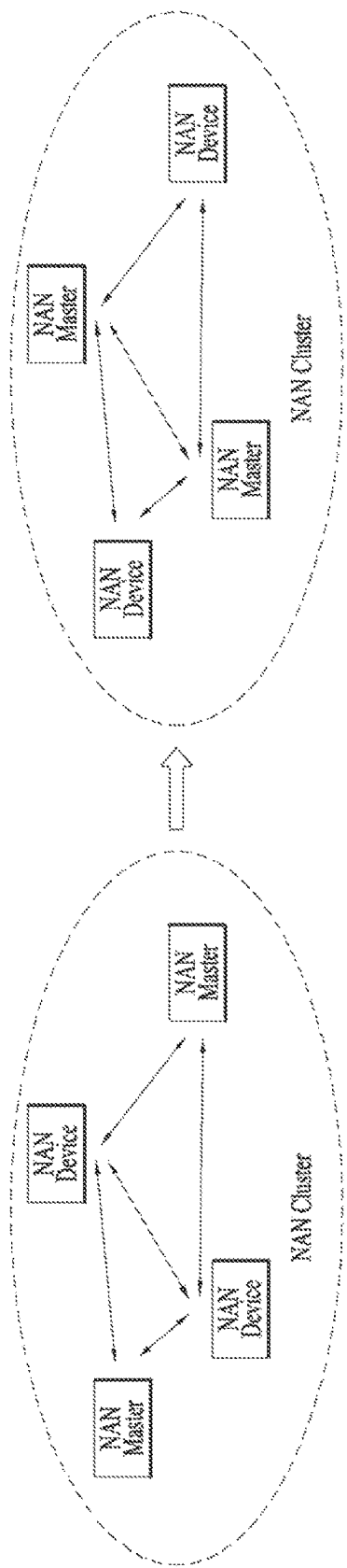

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
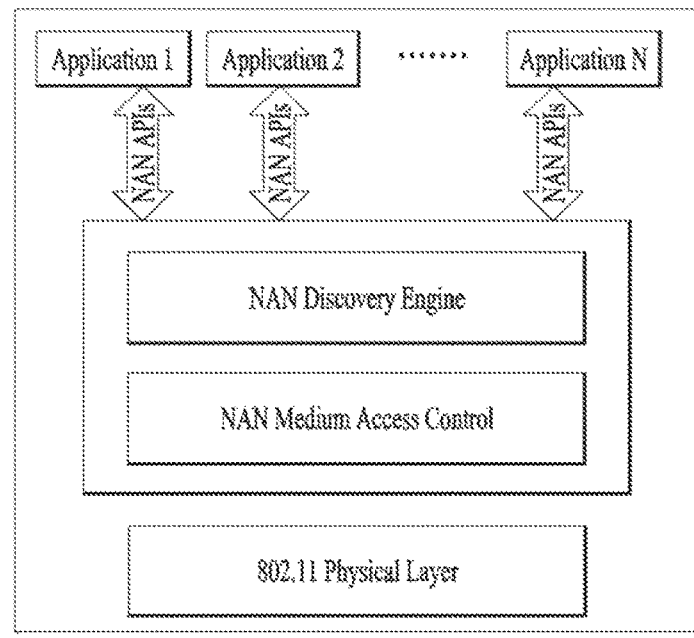
FIG. 4 illustrates an example of a structure of a NAN device (terminal)

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
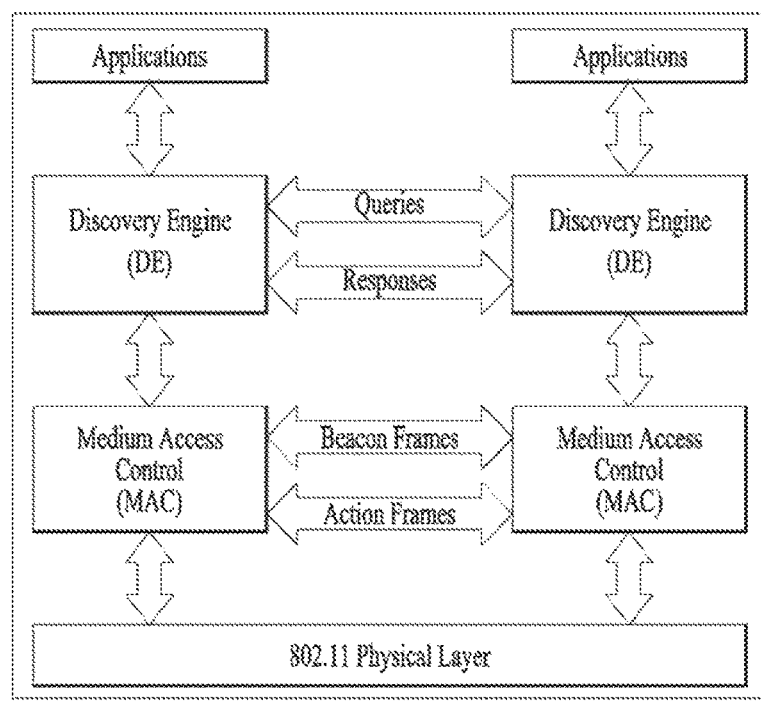
FIGS. 5 and 6 illustrate relations between NAN components.
Figure 6:
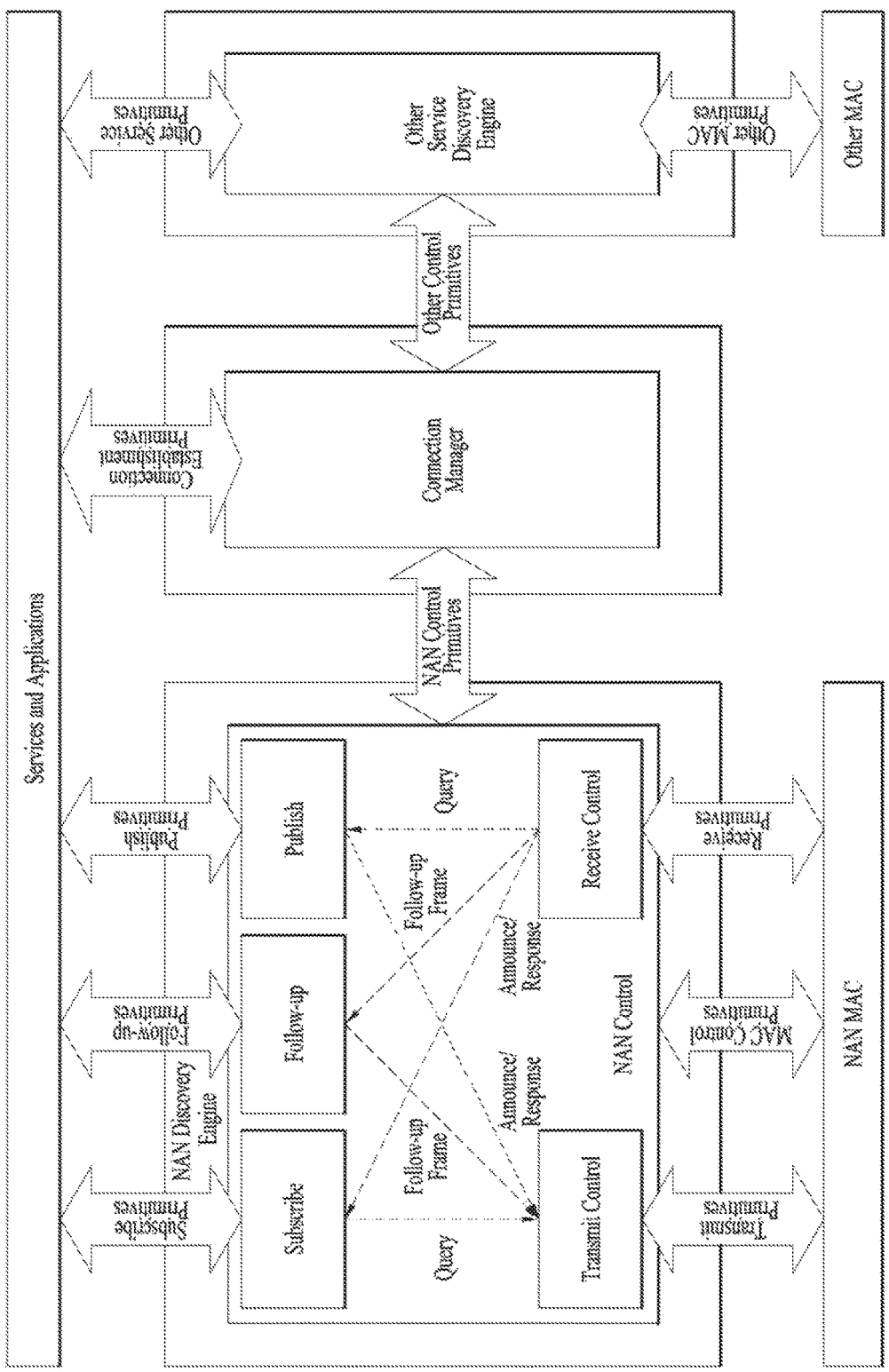

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
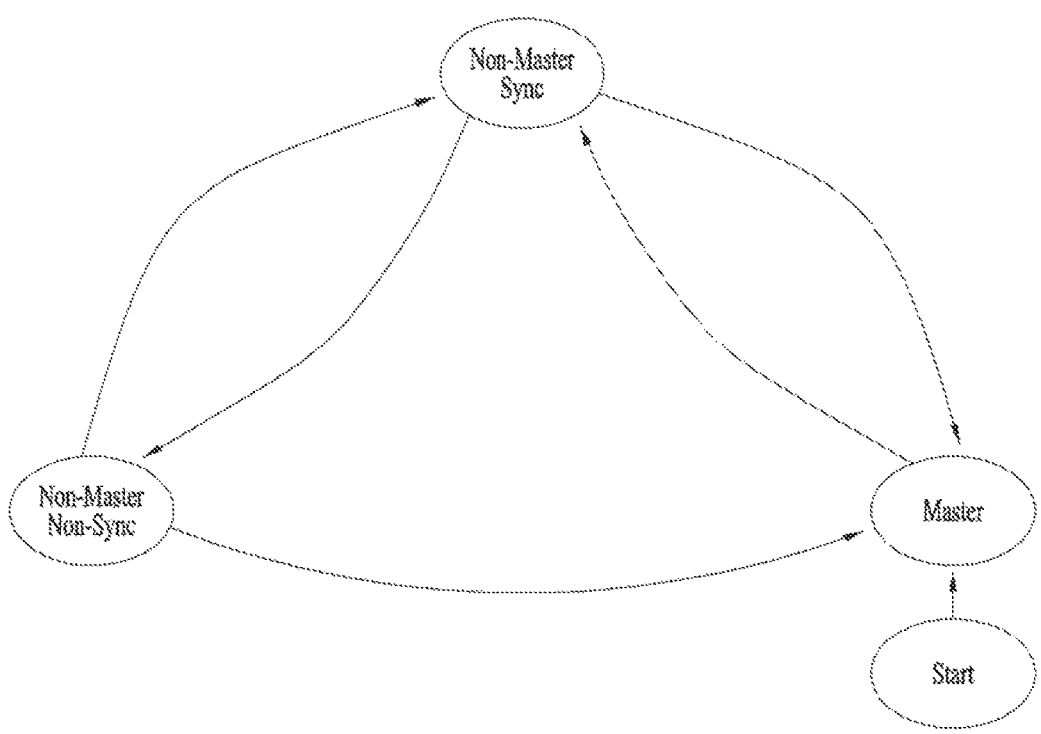
FIG. 7 is a diagram illustrating a state transition of a NAN device (terminal)

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$MasterRank = MasterPreference*2^{56} + RandomFactor*2^{48} + MAC[5]*2^{40} + \ldots + MAC[0]$$ [Formula 1]

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value−1) and if an AMBTT value is greater than the stored value, the NAN terminal newly stores the AMBTT value in the beacon frame. If the hop count value in the beacon frame is less than (the stored value−1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

NAN beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
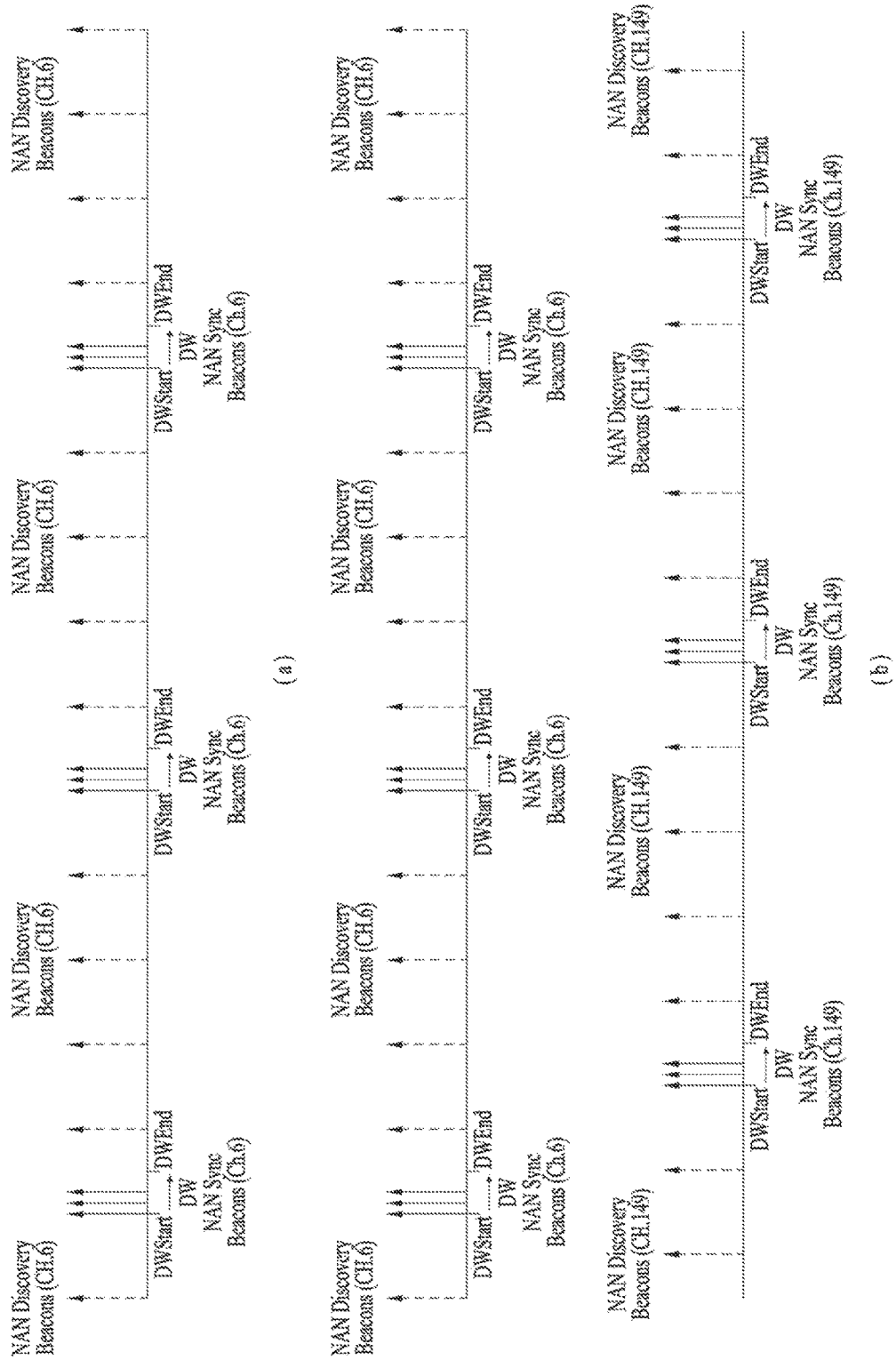

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (a) shows transmission of NAN discovery and synchronization beacon frames of a NAN terminal operating in 2.4 GHz band. FIG. 8 (b) shows transmission of NAN discovery and synchronization beacon frames of a NAN terminal operating in 2.4 GHz and 5 GHz bands.

In the following, a method of transmitting a NAN service discovery frame and a synch beacon frame according to embodiment of the present invention is explained.

Transmission of NAN Service Discovery Frame and Synch Beacon Frame

As mentioned in the foregoing description, a NAN terminal can transmit a NAN service discovery frame and/or a synch beacon frame on a DW. In particular, the NAN terminal transmits the NAN service discovery frame and/or the synch beacon frame between a start point (TStartDW) of the DW and an end point (TEndDW) of the DW based on contention.

First of all, in order to transmit the NAN service discovery frame, the NAN terminal determines a time (Tpkt (p)) that a packet (p) is available for transmission and starts a countdown according to a backoff counter (c_dw) of the NAN service discovery frame. In this case, in relation to specific contents of the countdown, it may follow what is defined in 802.11 unless it is mentioned in the present specification. If the countdown is finished, the NAN service discovery frame can be transmitted.

If the NAN terminal is in a master status or a non-master status, both the NAN service discovery frame and the synch beacon frame should be transmitted in an identical DW. In this case, it is necessary to determine priority for transmitting a frame among the NAN service discovery frame and the synch beacon frame.

In relation to this, if the NAN terminal transmits the synch beacon frame in the DW, the NAN service discovery frame can be configured to be transmitted only when the synch beacon frame is transmitted. In particular, the synch beacon frame is configured to have higher priority in an identical DW compared to the service frame. For example, a backoff counter of the NAN service discovery frame can be configured to stop counting down while a backoff counter of the synch beacon frame is counting down. The backoff counter of the NAN service discovery frame can be configured to resume countdown after the synch beacon frame is transmitted. Or, if transmission of the synch beacon frame is completed, Tpkt (p) of the NAN service discovery frame becomes a time at which the synch beacon frame is completed and the backoff counter of the NAN service discovery frame starts countdown from the time.

If the aforementioned configurations are made, it may be able to solve a system maintenance stability problem, which occurs when the NAN service discovery frame is transmitted prior to the sync beacon frame in a NAN system where the synch beacon frame and the discovery frame are configured to be transmitted in a single DW based on contention in a legacy NAN.

More specifically, according to a legacy NAN system, the sync beacon frame and the discovery frame are defined to be transmitted in an identical DW based on contention for efficiency of a resource use.

If the synch beacon frame and the NAN service discovery frame are configured to be transmitted in a different DW, it is necessary to configure a length of a DW to be short to make transmission of the NAN service discovery frame not to be too much delayed. In this case, since a time (Tpkt (p)) that a packet is available for transmission of the sync beacon frame corresponds to TStartDW+HC*40*aSlotTime, if a terminal has a big hop counter, the Tpkt (p) has no choice but to have a big value. Hence, it is difficult to configure a DW to be small. It is necessary to calculate a length of a DW capable of accommodating a big hop counter. In this case, if the number of terminals transmitting a synch beacon is not enough, it may become a resource waste. Hence, in order to guarantee efficiency of a resource use and freedom of a hop counter use, the synch beacon frame and the NAN service discovery frame are configured to be transmitted in an identical DW.

However, the NAN service discovery frame can be preferentially transmitted prior to the synch beacon frame under the aforementioned configuration. If a hop counter corresponds to 0, a backoff counter of the NAN service discovery frame is randomly selected from [0, CW] section. If the hop counter is greater than 0, the backoff counter of the NAN service discovery frame is randomly selected from [0, 31]. If the hop counter corresponds to 0, a backoff counter (c_dwb) of the synch beacon frame is randomly selected from [0, CW_RS] section. If the hop counter is greater than 0, the backoff counter of the synch beacon frame is randomly selected from [0, 31]. In this case, since CW may correspond to 511 and CW_RS may correspond to 15, the NAN service discovery frame can be preferentially transmitted prior to the synch beacon frame according to a randomly selected value. In this case, if a NAN terminal, which has failed to receive the synch beacon frame, transmits a service discovery beacon (in a state that synchronization is not matched), stability of an entire NAN cluster may be degraded.

Hence, as mentioned in the foregoing description, if priority of the sync beacon frame and priority of the NAN service discovery frame are configured, it is able to guarantee not only efficiency of a resource use but also freedom of a hop counter use. Moreover, it is also able to guarantee stability of an entire NAN cluster at the same time.

Figure 9:
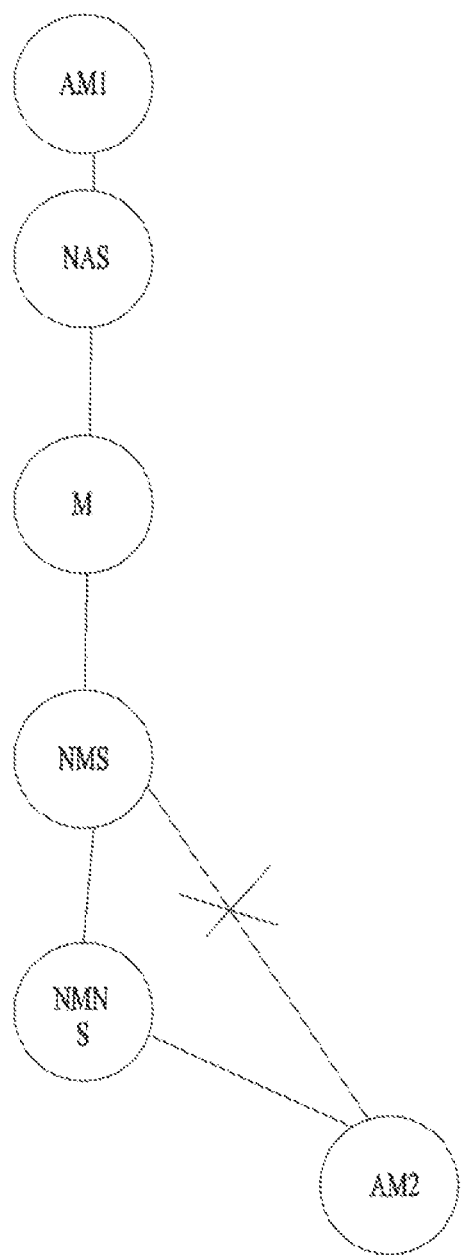
FIG. 9 is a diagram for explaining priority of frame transmission according to one embodiment of the present invention.

Subsequently, as shown in an example of FIG. 9, it is able to configure a first Tpkt (p) of the NAN service discovery frame to start from a time at which transmission of the sync beacon frame is completed. And, if it is necessary for a terminal to transmit a plurality of NAN service discovery frames, it is able to configure a second Tpkt (p) to become a time at which transmission of a first NAN service discovery frame is completed. In this case, a backoff counter can be generated per each packet. And, a value of the backoff counter can be configured to be increased according to a packet order. Or, a start of a corresponding range can be set to a first backoff counter+1. If it fails to transmit corresponding packets in a DW section, backoff counter values can be used in a next DW. In particular, a backoff counter value can be maintained although a DW is changed.

If a terminal does not transmit a synch beacon frame, in other word, if the terminal transmits a service discovery only, a backoff counter of the NAN service discovery frame can start from TStartDW+(HCmax+1)*40*aSlotTime. In this case, the TStartDW may correspond to a start point of the DW, the HCmax may correspond to a biggest hop count (capable of being delivered by an anchor master) in a cluster to which the NAN terminal belongs thereto, and the aSlotTime may correspond to a MAC value configured by the terminal. By doing so, it is able to guarantee transmission priority of sync beacon frames of all terminals in a cluster. Or, a hop counter value can be configured in a manner that a terminal applies a hop counter value of the terminal or adds a predetermined value to the hop counter of the terminal (e.g., a current hop counter of the terminal+1). A sync beacon frame or a NAN service discovery frame can be transmitted in a manner of including a hop counter value of a terminal in the sync beacon frame or the NAN service discovery frame. Having received the sync beacon frame or the NAN service discovery frame, terminals record a maximum value among the hop counter values when an anchor master or a master is selected and may be then able to transmit the information in a next DW section. A terminal can record and share the information only when a hop counter is greater than a hop counter of the terminal.

Meanwhile, as mentioned in the foregoing description, if a hop counter corresponds to 0, a backoff counter of the NAN service discovery frame is randomly selected from [0, CW] section. If the hop counter is greater than 0, the backoff counter of the NAN service discovery frame is randomly selected from [0, 31]. If a hop counter corresponds to 0, a backoff counter (c_dwb) of the sync beacon frame is randomly selected from [0, CW_RS] section. If the hop counter is greater than 0, the backoff counter of the sync beacon frame is randomly selected from [0, 31]. If the backoff counter of the sync beacon frame is configured as described above, a time and/or a frequency resource of an idle section can be wasted according to a hop counter. Hence, if a hop counter corresponds to 0, it may follow the aforementioned method. On the contrary, if a hop counter is greater than 0, it may be able to configure the backoff counter of the sync beacon frame to start at [A+(HC−1)*B+HC*C, A+(HC*B)+(HC+1)*C]. In this case, A corresponds to a value set to a section maximum value or a maximum value+1 to configure the backoff counter of the sync beacon frame when HC corresponds to 0. B corresponds to a section size value configured per each of the HC. C corresponds to a variable for securing a section for transmitting a NAN service discovery frame in each section. The section size value, which is configured according to the HC, may correspond to a value configured with a same interval or a predetermined value configured per each of the HC.

If the backoff counter of the sync beacon frame is configured by the method described above, Tpkt (p) may correspond to TStartDW+c_dwb*aSlotTime. When the hop counter is greater than 0, if C value is set and used in an equation of the backoff counter of the sync beacon frame, it is able to obtain a backoff counter value for a NAN service discovery frame in a corresponding section per hop counter. Or, if a hop counter is greater than 0, a backoff counter of a sync beacon frame is configured in a form similar to the equation of the backoff counter of the sync beacon frame and a backoff counter of a NAN service discovery frame can be configured using a legacy method.

Figure 10:
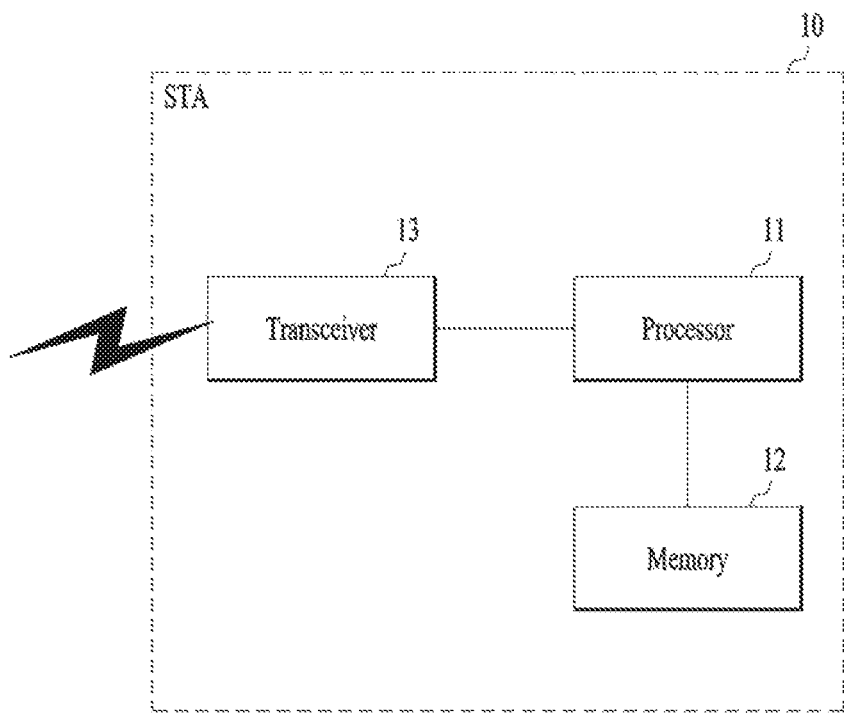
FIG. 10 is a block diagram illustrating a configuration of a wireless device according to one embodiment of the present invention.

FIG. 10 is a block diagram illustrating a configuration of a wireless device according to one embodiment of the present invention.

Referring to FIG. 10, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Alternatively, the processor 11 may be configured to perform operations related to a device operating as an AP/STA. Moreover, a module for implementing the operations of the wireless device according to the various embodiments of the present invention mentioned in the foregoing description may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 in FIG. 10 may be implemented such that each of the various embodiments of the present invention described above is applied independently or at least two thereof are simultaneously applied. And, redundant description shall be omitted for clarity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public.

As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

Although the various embodiments of the present invention have been described above mainly with reference to an IEEE 802.11 system, the present invention can be applied to various mobile communication systems in the same manner.

What is claimed is:

1. A method of transmitting a NAN (neighbor awareness networking) service discovery frame during a DW (discovery window) in a wireless communication system, the method performed by a NAN terminal and comprising:
   determining a time that a packet is available for transmission of a first NAN service discovery frame;
   starting a backoff counter for the first NAN service discovery frame at the determined time; and
   transmitting the first NAN service discovery frame when countdown of the backoff counter for the first NAN service discovery frame is completed,
   wherein the backoff counter for the first NAN service discovery frame is stopped while a backoff counter for a sync beacon frame is counting down if the sync beacon frame is transmitted during the DW.

2. The method of claim 1, wherein the backoff counter for the first NAN service discovery frame is generated for each of a plurality of packets.

3. The method of claim 1, wherein the determined time after transmission of the sync beacon frame is completed.

4. The method of claim 3, wherein a time that a packet is available for transmission of a second NAN service discovery frame is after transmission of the first NAN service discovery frame is completed if a plurality of NAN service discovery frames are transmitted.

5. The method of claim 1, wherein:
   the backoff counter for the first NAN service discovery frame is started at TStartDW+HC*40*aSlotTime;
   TStartDW corresponds to a start point of the DW;
   HC corresponds to a hop counter; and
   aSlotTime corresponds to a configured MAC (medium access control) value.

6. The method of claim 5, wherein the backoff counter for the sync beacon frame corresponds to a value randomly selected from if the HC is greater than 0.

7. The method of claim 1, wherein:
   the backoff counter for the first NAN service discovery frame is started at TStartDW+(HCmax+1)*40*aSlotTime;
   TStartDW corresponds to a start point of the DW;
   HCmax corresponds to a largest hop counter in a cluster to which the NAN terminal belongs; and
   aSlotTime corresponds to a configured MAC (medium access control) value.

8. The method of claim 1, wherein:
   the backoff counter for the sync beacon frame starts at [A+(HC−1)*B+HC*C, A+(HC*B)+(HC+1)*C] when a hop counter of the NAN terminal is greater than 0;
   HC corresponds to the hop counter;

A corresponds to a value configured as a section maximum value or a maximum value +1 for configuring the backoff counter for the sync beacon frame when the HC is 0;

B corresponds to a section size value configured for the HC; and

C corresponds to a variable for securing a section for transmitting the first NAN service discovery frame in each of a plurality of sections.

9. The method of claim 8, wherein the configured section size value corresponds to a value configured with a same interval or a value predetermined for the HC.

10. The method of claim 1, wherein the backoff counter for the first NAN service discovery frame is resumed when the sync beacon frame is transmitted.

11. The method of claim 1, wherein a status of the NAN terminal is master status.

12. A NAN (neighbor awareness networking) terminal transmitting a NAN service discovery frame during a DW (discovery window) in a wireless communication system, the NAN terminal comprising:

a transceiver configured to transmit radio signals; and a processor connected to the transceiver and configured to:

determine a time that a packet is available for transmission of a first NAN service discovery frame;

start a backoff counter for the first NAN service discovery frame at the determined time; and control the transceiver to transmit the first NAN service discovery frame when countdown of the backoff counter for the first NAN service discovery frame is completed, wherein the backoff counter for the first NAN service discovery frame is stopped while a backoff counter for a sync beacon frame is counting down if the sync beacon frame is transmitted during the DW.

13. The NAN terminal of claim 12, wherein the backoff counter for the first NAN service discovery frame is generated for each of a plurality of packets.

14. The NAN terminal of claim 12, wherein the determined time is after transmission of the sync beacon frame is completed.

15. The NAN terminal of claim 12, wherein:

the backoff counter for the first NAN service discovery frame is started at $TStartDW+HC*40*aSlotTime$;

TStartDW corresponds to a start point of the DW;

HC corresponds to a hop counter; and aSlotTime corresponds to a configured MAC (medium access control) value.

16. The NAN terminal of claim 15, wherein the backoff counter for the sync beacon frame corresponds to a value randomly selected from [0 31] if the HC is greater than 0.

17. The NAN terminal of claim 12, wherein:

the backoff counter for the first NAN service discovery frame is started at $TStartDW+(HCmax+1)*40*aSlotTime$;

TStartDW corresponds to a start point of the DW;

HCmax corresponds to a largest hop counter in a cluster to which the NAN terminal belongs; and aSlotTime corresponds to a configured MAC (medium access control) value.

18. The NAN terminal of claim 12, wherein:

the backoff counter for the sync beacon frame starts at $[A+(HC-1)*B+HC*C, A+(HC*B)+(HC+1)*C]$ when a hop counter of the NAN terminal is greater than 0;

HC corresponds to the hop counter;

A corresponds to a value configured as a section maximum value or a maximum value +1 for configuring the backoff counter for the sync beacon frame when the HC is 0;

B corresponds to a section size value configured for the HC; and

C corresponds to a variable for securing a section for transmitting the first NAN service discovery frame in each of a plurality of sections.

19. The NAN terminal of claim 12, wherein the backoff counter for the first NAN service discovery frame is resumed when the sync beacon frame is transmitted.

20. The NAN terminal of claim 12, wherein a status of the NAN terminal is master status.

* * * * *